US010037045B2

(12) United States Patent
Wan et al.

(10) Patent No.: US 10,037,045 B2
(45) Date of Patent: Jul. 31, 2018

(54) SYSTEMS AND APPARATUSES FOR A CONFIGURABLE TEMPERATURE DEPENDENT REFERENCE VOLTAGE GENERATOR

(71) Applicant: MICRON TECHNOLOGY, INC., Boise, ID (US)

(72) Inventors: Yuanzhong Wan, Boise, ID (US); Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/283,605

(22) Filed: Oct. 3, 2016

(65) Prior Publication Data

US 2018/0095486 A1 Apr. 5, 2018

(51) Int. Cl.
*G05F 1/46* (2006.01)
*G01K 1/02* (2006.01)

(52) U.S. Cl.
CPC .............. *G05F 1/463* (2013.01); *G01K 1/02* (2013.01); *G05F 1/465* (2013.01)

(58) Field of Classification Search
CPC ........................................................ G05F 1/463
See application file for complete search history.

(56) References Cited

U.S. PATENT DOCUMENTS 8,994,428 B2 * 3/2015 Ham ...................... G05F 1/463 327/176
9,285,813 B2 * 3/2016 Pietri ..................... G05F 1/575

* cited by examiner

*Primary Examiner* — Jeffrey Zweizig
(74) *Attorney, Agent, or Firm* — Dorsey & Whitney LLP

(57) ABSTRACT

Systems and apparatuses for a configurable, temperature dependent reference voltage generator are provided. An example apparatus includes control logic configured receive temperature data, and produce a signal, based on the temperature data, indicative of the temperature data, a temperature dependence and a temperature slope. The apparatus may also include a temperature slope reference generator configured to produce a reference voltage having the temperature dependence and the temperature slope, based on the signal from the control logic.

18 Claims, 12 Drawing Sheets

1000A

SYSTEMS AND APPARATUSES FOR A CONFIGURABLE TEMPERATURE DEPENDENT REFERENCE VOLTAGE GENERATOR

BACKGROUND

High performance and reduced power consumption are important factors for semiconductor devices, especially in mobile and other battery-powered applications. With process technologies shrinking to sub-10 nm levels, supply voltages have decreased to below IV while operating speeds have continued to increase. Conventionally, bandgap voltage references are utilized to provide a stable, temperature independent, direct current (DC) reference voltage. This reference voltage may then be provided to a DC-DC converter to produce an internal, regulated supply voltage. However, process corner variations in a fabrication process may introduce differences in operation. Accordingly, a stable supply voltage may be inefficient or inadequate in different situations.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

The following detailed description illustrates a few exemplary embodiments in further detail to enable one of skill in the art to practice such embodiments. The described examples are provided for illustrative purposes and are not intended to limit the scope of the invention. In the following description, for the purposes of explanation, numerous specific details are set forth in order to provide a thorough understanding of the described embodiments. It will be apparent to one skilled in the art, however, that other embodiments of the present invention may be practiced without some of these specific details.

Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
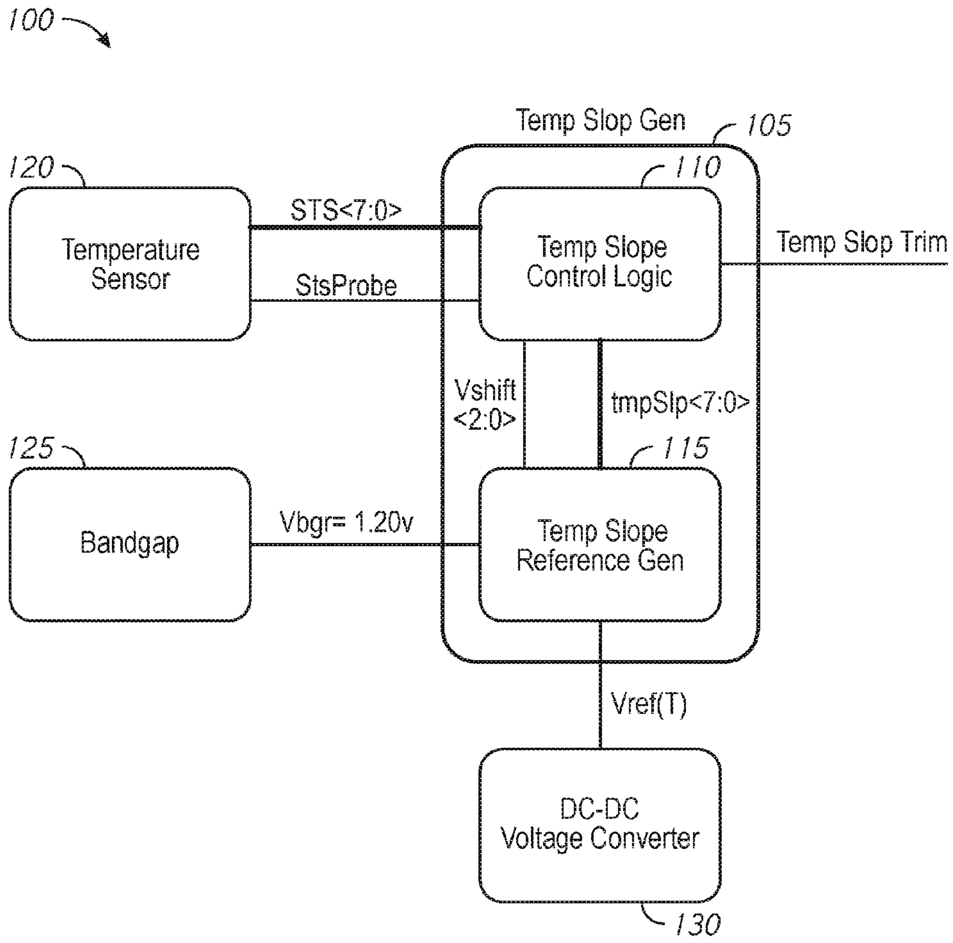
FIG. 1 is a schematic block diagram of a configurable temperature dependent reference voltage generator, in accordance with various embodiments.

FIG. 1 illustrates a schematic block diagram of a reference voltage generator 100, according to various embodiments. Generally speaking, the lower the supply voltage, the less power is consumed. Conversely, the higher the supply voltage, the faster the operating speeds. Accordingly, embodiments of the configurable, temperature dependent reference voltage generator provide a way to balance power consumption against meeting required speed specifications. For example, an internal, regulated supply voltage may need to have a negative temperature slope, commonly referred to as complementary to absolute temperature (CTAT), at fast (FF) process corners, and a positive temperature slope, commonly referred to as proportional to absolute temperature (PTAT), at slow (SS) process corners. At typical (TT) process corners, a flat supply voltage may be utilized. Thus, in various embodiments, the configurable temperature dependent voltage generator 100 may be trimmed to produce CTAT, PTAT, or flat temperature dependent reference voltage ("Vref(T)") to a DC-DC converter 130. Taking reliability concerns into account, in various further embodiments, the configurable temperature dependent reference voltage generator 100 may also clip the reference voltage at a maximum voltage or a minimum voltage, or both. The clipping may be configured to occur below a minimum temperature, above a maximum temperature, or both. Accordingly, various embodiments of the configurable temperature dependent reference voltage generator 100 provide the ability to select between CTAT, PTAT, or flat temperature dependence; to select between multiple temperature slopes for a CTAT or PTAT signal; to adjust clipping behavior; and to offset voltages via a voltage shift.

According to various embodiments, the reference voltage generator 100 may include a temperature slope generator 105, which further includes control logic 110, and temperature slope reference generator 115; a temperature sensor 120; and bandgap voltage generator 125. The temperature slope generator 105 may be communicatively coupled to the temperature sensor 120, and bandgap voltage generator 125. The temperature slope generator 105 may, in turn, have an output communicatively coupled to a DC-DC voltage converter 130. The reference voltage generator 100 may be configured to generate a temperature dependent reference voltage, based on temperature data from temperature sensor 120. In various embodiments, the temperature data may be used, by temperature slope generator 105, to implement clipping, create temperature dependent behavior, and adjust a temperature slope of the temperature dependent reference voltage.

In various embodiments, the temperature sensor 120 may be configured to provide a digital temperature signal (STS) to the temperature slope generator 105. In one set of embodiments, the temperature sensor 120 may encode temperature data into an 8-bit code indicative of the temperature. In some embodiments, more or less than 8-bits may be utilized to represent the temperature data. Accordingly, in various embodiments, the temperature sensor 120 may include an analog sensor core, an analog to digital converter (ADC), and calibration logic. The analog core may be configured to provide an analog temperature reading. The ADC may then be configured to convert the analog temperature reading to a digital signal, also referred to as a raw temperature code. In one set of embodiments, the ADC may utilize delta-sigma modulation to perform analog-digital conversion. In some embodiments, the ADC may be configured to convert the analog temperature reading to the raw temperature code with a quantization error on the order of 1 degree Celsius (C). In this way, the raw temperature code may be configured to change by 1 bit for every 1 degree C. change.

The raw temperature code may then be calibrated, by the calibration logic. In one set of embodiments, the calibration logic may be a subtract circuit configured to center the raw temperature code to a desired calibration temperature by subtracting an offset from the current raw temperature code. For example, in one set of embodiments, the offset may be a fuse-stored raw temperature code at a calibration temperature. Alternatively, in some embodiments, the calibration logic may support two-point calibration, or non-linear calibration. Thus, a final temperature code may be calibrated and output as STS.

Figure 4:
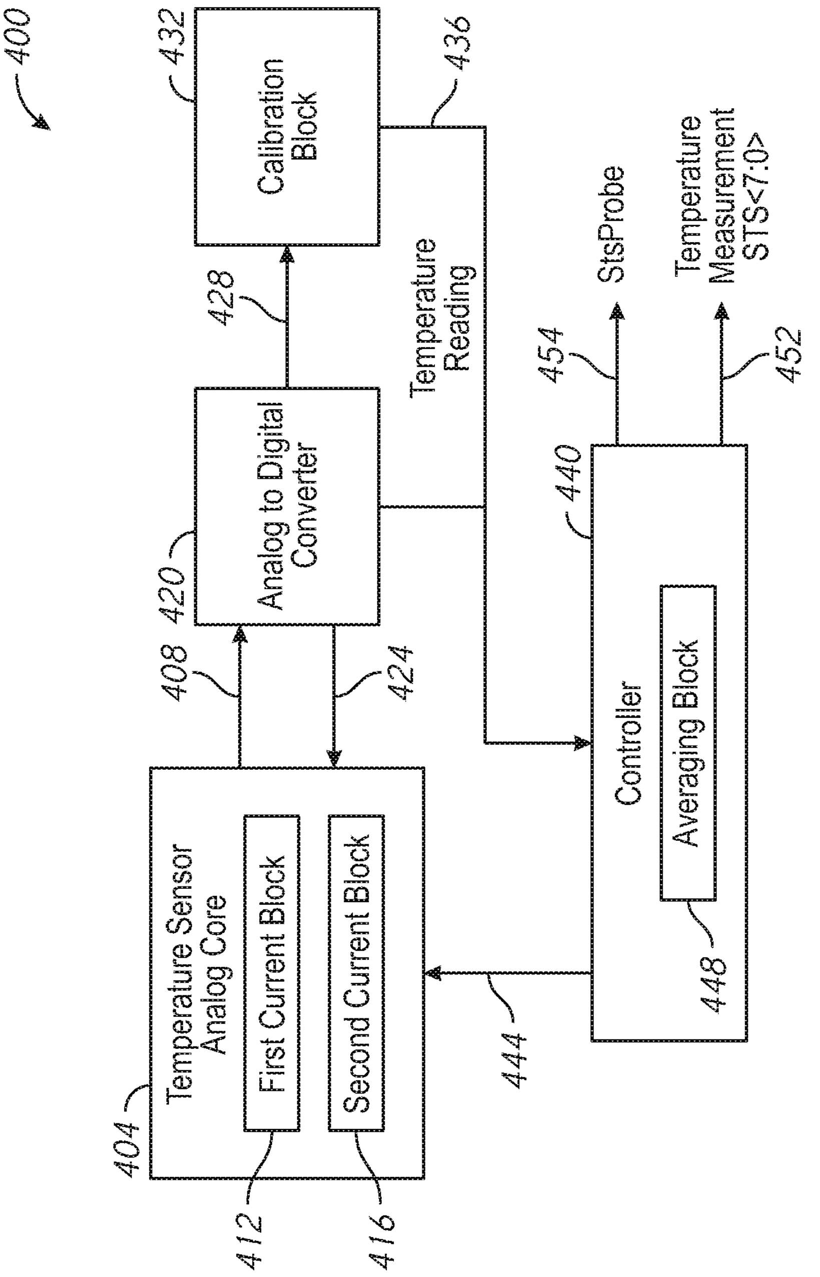
FIG. 4 is a schematic block diagram of an analog core temperature sensor, in accordance with various embodiments.

FIG. 4 is a schematic illustration of an apparatus (e.g., an integrated circuit, a memory device, a memory system, an electronic device or system, a smart phone, a tablet, a computer, a server, etc.) that includes a temperature sensor 400 in accordance with the present disclosure. With reference to FIGS. 1 & 4, the temperature sensor 120, 400 may be a component of an integrated circuit, memory device, or other electronic device. The temperature sensor 120, 400 includes an analog core 404 that is generally configured to generate a temperature dependent output signal 408 that may be sampled to acquire a temperature reading from the analog core 404.

In one set of embodiments, the analog core 404 may be configured to sample a temperature dependent output 408 of the analog core 404. The temperature sensor 120, 400 may then provide the resulting temperature measurement as output to be used by the integrated circuit, memory device, or electronic device with which the temperature sensor 120, 400 is associated. By way of example, if the temperature sensor 120, 400 is associated with a memory device, the memory device may use the temperature measurement provided by the temperature sensor 120, 400 to determine a refresh rate.

In various embodiments, the analog core 404 may provide a temperature dependent output 408 that takes the form of one or more temperature dependent currents. The analog core 404 may generate a temperature dependent current through the operation of one or more devices whose operating characteristics change with changes in temperature. In one example, the analog core 404 may include a diode, a bipolar junction transistor (BJT), or a BJT coupled diode that generates a temperature dependent current. In other examples, the analog core 404 may generate a temperature dependent current through the operation of a field effect transistor or similar device. Generally, the analog core 404 may generate a temperature dependent current via any diode, transistor, semiconductor or other electronic device that exhibits a temperature dependent behavior.

According to a set of embodiments, the analog core 404 may include a first current block 412 that provides a first temperature dependent current that is directly proportional to temperature ($I_{PTAT}$). The temperature sensor 120, 400 may be configured to sample the first current or to otherwise use the first current in an output 408 sampling process that acquires a temperature reading from the analog core 404. Because the first current is directly proportional to temperature, the temperature sensor 120, 400 registers an increase in the magnitude of the first current as an increase in temperature. Conversely, the temperature sensor 120, 400 registers a decrease in the magnitude of the first current as a decrease in temperature. In some embodiments, the analog core 404 additionally includes a second current block 416 that provides a second temperature dependent current that is inversely proportional to temperature ($I_{CTAT}$). The temperature sensor 120, 400 may be configured to sample the second current or to otherwise use the second current to support temperature sensing.

In various embodiments, the analog core 404 may provide a temperature dependent output 408 to an ADC 420. The ADC 420 may generally configured to convert the temperature dependent output 408 from the analog core 404 to a digital code representing a temperature reading. In acquiring the temperature reading, the ADC 420 may provide various control inputs 424 that operate to control various components of the analog core 404. In one respect, the ADC 420 may provide control inputs 424 so as to use $I_{PTAT}$ and $I_{CTAT}$ to drive a sense node to a reference voltage. When the sense node is below the reference voltage, the ADC 420 may cause the sense node to be pulled-up by the $I_{PTAT}$ current. When the sense node is above the reference voltage, the ADC 420 may cause the sense node to be pulled-down by the $I_{CTAT}$ current. When the ADC 420 operates in this manner, the ADC 420 may take a temperature reading of the analog core 120, 400 by reading a digital code that corresponds to the number of times during a predetermined interval that the reference voltage is exceeded.

In various embodiments, the ADC 420 may provide the digital code read from the analog core 404 as output 428 to a calibration block 432. The calibration block 432 may be configured to re-center the digital code at a zero point based on a baseline temperature around which the analog core 404 is known to operate. The calibration block 432 may re-center the digital code provided by the ADC 420 by subtracting out an offset that is determined by analog core 404 output measured at the baseline temperature. For example, if the baseline temperature is 90° C., the ADC 420 may read the analog core 404 at this temperature and the calibration block 432 may store the resulting digital code as a predetermined offset. When the calibration block 432 subtracts this offset from subsequent temperature measurement, the resulting digital code is re-centered at 90° C. such that a digital code of 0x00 corresponds to a temperature of 90° C. This re-centered digital code may be provided as the final temperature sensor 120, 400 output, by the controller 440, at a temperature measurement output 452. In some embodiments, the signal may be output as an 8-bit temperature code, such as STS <7:0>. The controller 440 may further be in communication with the control logic 110. Thus, the controller 440 may also be configured to output a control signal 454, such as StsProbe. In some embodiments, StsProbe may indicate to the control logic 110 that new temperature information is available, and that the temperature code, STS <7:0>, should be read. For example, in some embodiments, StsProbe may be generated each time the temperature changes. In other embodiments, StsProbe may be generated periodically. In further embodiments, StsProbe may be generated in response to an input or request from an external source. Accordingly, in some embodiments, StsProbe may be a latch control signal for a latch circuit in the control logic 110 to latch the temperature code STS <7:0>.

The ADC 420 may be configured to increment or decrement the digital code by 1 for every 1° C. change in temperature. Thus, continuing with the above example, the final temperature sensor output may be 0x01 at 91° C., 0x0A at 100° C., 0xFF at 89° C., and so on. In some embodiments, the calibration block 432 determines an offset during an initial setup when the temperature sensor 120, 400 is first enabled. In other embodiments, the calibration block 432 determines an offset each time a temperature reading or group of temperature readings are taken from the analog core 404.

Figure 2:
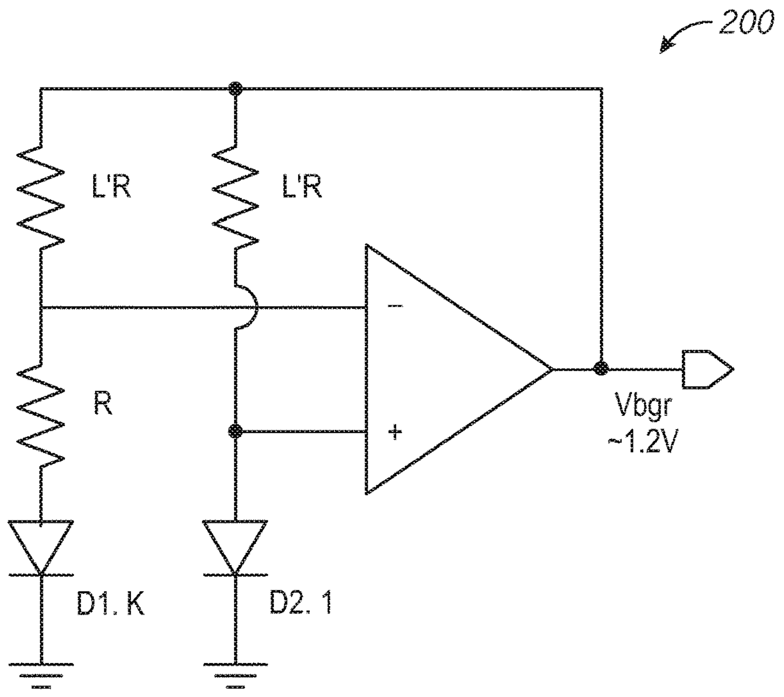
FIG. 2 (Prior Art)
FIG. 2 is a schematic diagram of a conventional bandgap voltage generator, in accordance with various embodiments.

In various embodiments, the bandgap voltage generator 125 may be communicatively coupled to the temperature slope generator 105. The bandgap voltage generator 125 may be configured to generate a constant bandgap voltage that is temperature independent. In some embodiments, the bandgap voltage generator may be an on-die bandgap circuit. With reference to FIG. 2, an example of a conventional bandgap voltage generator 200 is provided. In general, existing on-die bandgap voltage generators, such as the conventional bandgap voltage generator 200, may be utilized in various embodiments. Accordingly, in various embodiments, the bandgap voltage should be insensitive to process variations, supply voltage, and temperature. The output, instead, is configured to depend on a ratio of resistances (L) and current densities of the diodes (K).

In various embodiments, temperature slope generator 105 may be configured to receive the digital temperature reading, SITS, of temperature sensor 120. The digital temperature reading may be provided as an input to the control logic 110. The control logic 110 may in turn be configured to produce a control signal based on the temperature reading, and provide the control signal to the temperature slope reference generator 115. According to various embodiments, the control signal may be indicative of, without limitation, temperature data, clipping behavior, a selection of flat, PTAT, or CTAT temperature dependence, and a temperature slope rate.

Figure 5:
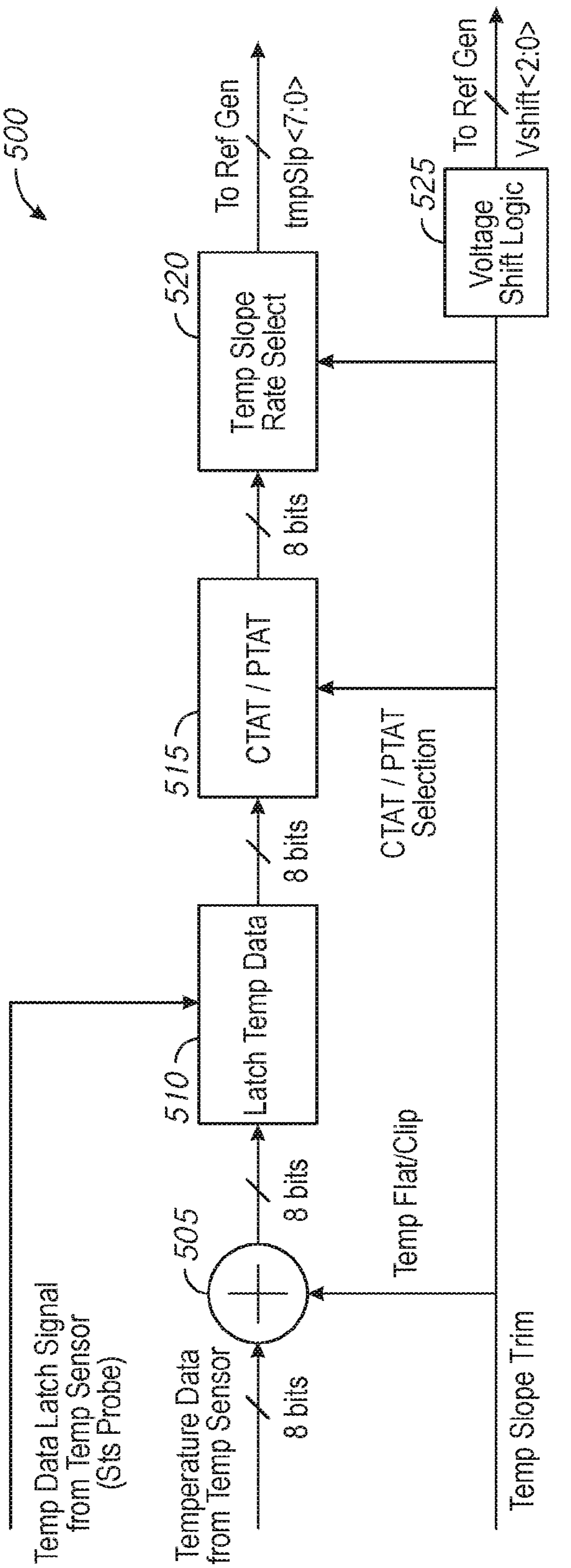
FIG. 5 is a schematic block diagram of a control circuit, in accordance with various embodiments.

The control logic 110 will be described in further detail below, with respect to FIGS. 5 & 6. FIG. 5 illustrates a block diagram of control circuit 500 according to various embodiments. The control circuit 500 may include clip logic 505, latch 510, temperature dependence selection logic 515, temperature slope selection logic 520, and voltage shift logic 525. In various embodiments, the clip logic 505 may receive temperature data from the temperature sensor 120. The clip logic 505 may be configured to clip the temperature data if the encoded temperature is above a high threshold temperature, or below a low threshold temperature. In some embodiments, clipping may be implemented by the clip logic 505 at just one of the high threshold temperature or low threshold temperature. In other embodiments, clipping may be implemented by the clip logic 505 at both the high threshold temperature and low threshold temperature. In some embodiments, clip logic 505 may not clip the temperature data at all.

In further embodiments, the clip logic 505 may be configured to implement a selection of flat temperature dependence. In the case of flat temperature dependence, clip logic 505 may be configured to modify the temperature data to a different temperature code corresponding to a desired reference voltage. For example, in one set of embodiments, it may be desired that a flat reference voltage be provided at 800 mV. A reference voltage of 800 mV may correspond to 25 C of a PTAT signal or 90 C of a CTAT signal. Accordingly, the clip logic 505 may be configured to always output a temperature code of either 25 C or 90 C when flat temperature dependence is selected. If 25 C is used, PTAT temperature dependence should be selected at the temperature dependence selection logic 515. When 90 C is used, CTAT temperature dependence should be selected at the temperature dependence selection logic 515. Alternatively, the temperature data may be held constant at any temperature code, and a voltage shift is provided, via voltage shift logic 525, to adjust the reference voltage to the desired voltage. In this way, a flat reference voltage may be generated and adjusted.

Figure 9:
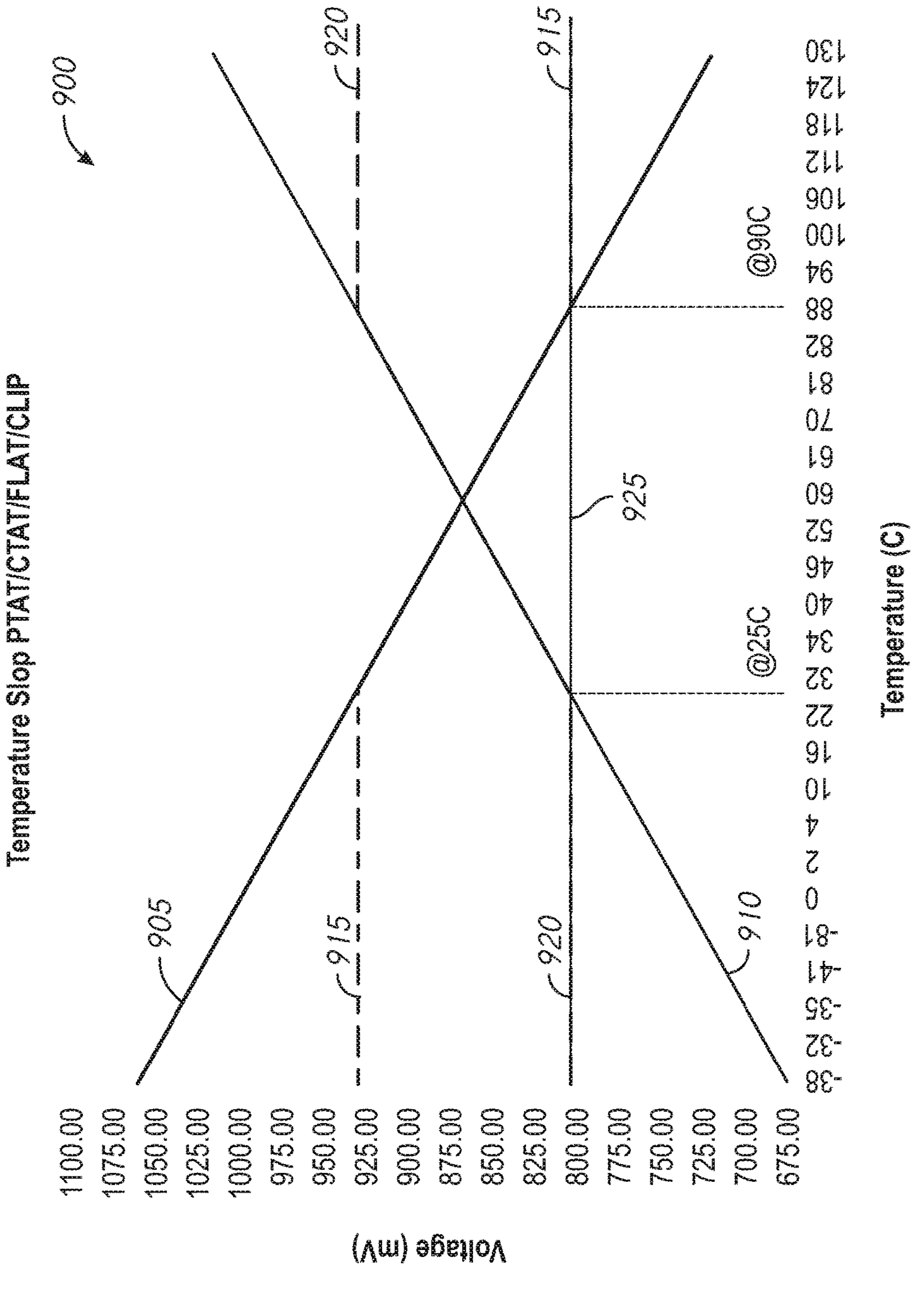
FIG. 9 illustrates voltage versus temperature of CTAT, PTAT, clipped CTAT, clipped PTAT, and flat configurations, in accordance with various embodiments.

The effect of clipping and flat selection is illustrated with respect to FIG. 9. FIG. 9 plots voltage versus temperature of CTAT, PTAT, clipped CTAT, clipped PTAT, and a flat reference voltage 925, according to various embodiments. For example, line 905 depicts a falling CTAT signal with no clipping. Line 910 depicts a rising PTAT signal with no clipping. Line 915 corresponds to the CTAT signal, but clipped at a low threshold voltage of 25 C, and a high threshold voltage of 90 C. Accordingly, line 915 shows that voltage remains the same as the voltage at 25 C, even as temperature falls below 25 C. Correspondingly, the voltage remains the same as the voltage at 90 C, even as temperature rises above 90 C. Line 920 shows a corresponding clipped PTAT signal. Here, again, the low threshold temperature is set to 25 C and the high threshold temperature is set to 90 C. Accordingly, line 920 shows that the voltage is clipped at the voltage at 25 C as temperature falls below 25 C, is clipped at the voltage at 90 C as temperature rises above 90 C. When a flat reference voltage is implemented, as shown by line 925, the voltage remains constant at the lower clip voltage. In alternative embodiments, the flat voltage may be set to a different voltage, such as the higher clip voltage, or to any other desired voltage.

The temperature data from temperature sensor 120, as adjusted by clip logic 505, may be output as clipped temperature data to latch 510. In various embodiments, latch 510 may be configured to latch the clipped temperature data for further processing. Latch 510 may be configured to latch the clipped temperature data according to a latch control signal, such as StsProbe. In one set of embodiments, the latch control signal may be provided from the temperature sensor 120. The clipped temperature data may be stored by latch 510 in various ways, including, without limitation, continuously, periodically, or manually upon request or command.

The latched temperature data, from latch 510, may then be output to temperature dependence selection logic 515. In various embodiments, temperature dependence selection logic 515 may be configured to allow selection between PTAT or CTAT temperature dependence behavior. In one set of embodiments, PTAT or CTAT selection may be achieved by simply selecting between the latched temperature data and an inverted latched temperature data. This relationship may be determined by the specific configuration of the slope reference generator 115. For example, if at the temperature slope reference generator 115, non-inverted temperature data is associated with PTAT, the inverted temperature data may be associated with CTAT. Likewise, if inverted temperature data is associated with PTAT, non-inverted temperature data may be associated with CTAT.

In various embodiments, selection between CTAT and PTAT temperature dependence may be made based on input from an on-die process monitor. The on-die process monitor may indicate control signals indicative of whether the process corner is an FF, SS, or TT process corner. In one set of embodiments, for an FF process corner, the process monitor may provide control signals to the temperature dependence selection logic 515, such that CTAT temperature dependence is selected. Conversely, for an SS process corner, the process monitor may provide control signals to the temperature dependence selection logic 515, such that PTAT temperature dependence is selected. For a TT process corner, the process monitor may provide a control signal to the clip logic 505 in addition to the temperature dependence selection logic 515. As described above with respect to previous embodiments, the control signals may be configured to cause clip logic 505 to modify temperature data to a temperature code corresponding to a desired reference voltage. The process corner monitor may then cause the temperature dependence selection logic 515 to choose one of CTAT or PTAT appropriately, based on the reference voltage desired.

The temperature data with temperature dependence information may be output, from temperature dependence selection logic 515, for further processing by temperature slope selection logic 520. Temperature slope selection logic 520 may be configured to add a temperature slope trim selection to the temperature data. Temperature slope may refer to the amount that a voltage changes over a set temperature range. For example, in one set of embodiments, temperature slopes, measured in mV/C, may include, without limitation, 0.5 mV/C, 0.75 mV/C, 1 mV/C, 1.25 mV/C, 1.5 mV/C, 1.75 mV/C, and 2 mV/C. It is to be understood that these slopes, and step size between these slopes, are provided by way of example only, and are not meant to be limiting in any way. It will be appreciated by those skilled in the art that in other embodiments, different slopes and step sizes may be configured in the temperature slope reference generator 115. Accordingly, in various embodiments, the smaller step sizes may allow for more gradual changes to the temperature dependent reference voltage, whereas larger step sizes will result in steeper changes to the temperature dependent reference voltage.

With this in mind, once a maximum temperature slope has been determined, the temperature slope selection logic 520 may be configured to adjust a temperature sensitivity of the maximum temperature slope. For example, in one set of embodiments, the temperature slope selection logic 520 may include various temperature sensitivities. Each of the temperature sensitivities may correspond to how the least significant bits of the temperature data are handled.

Figure 8A:
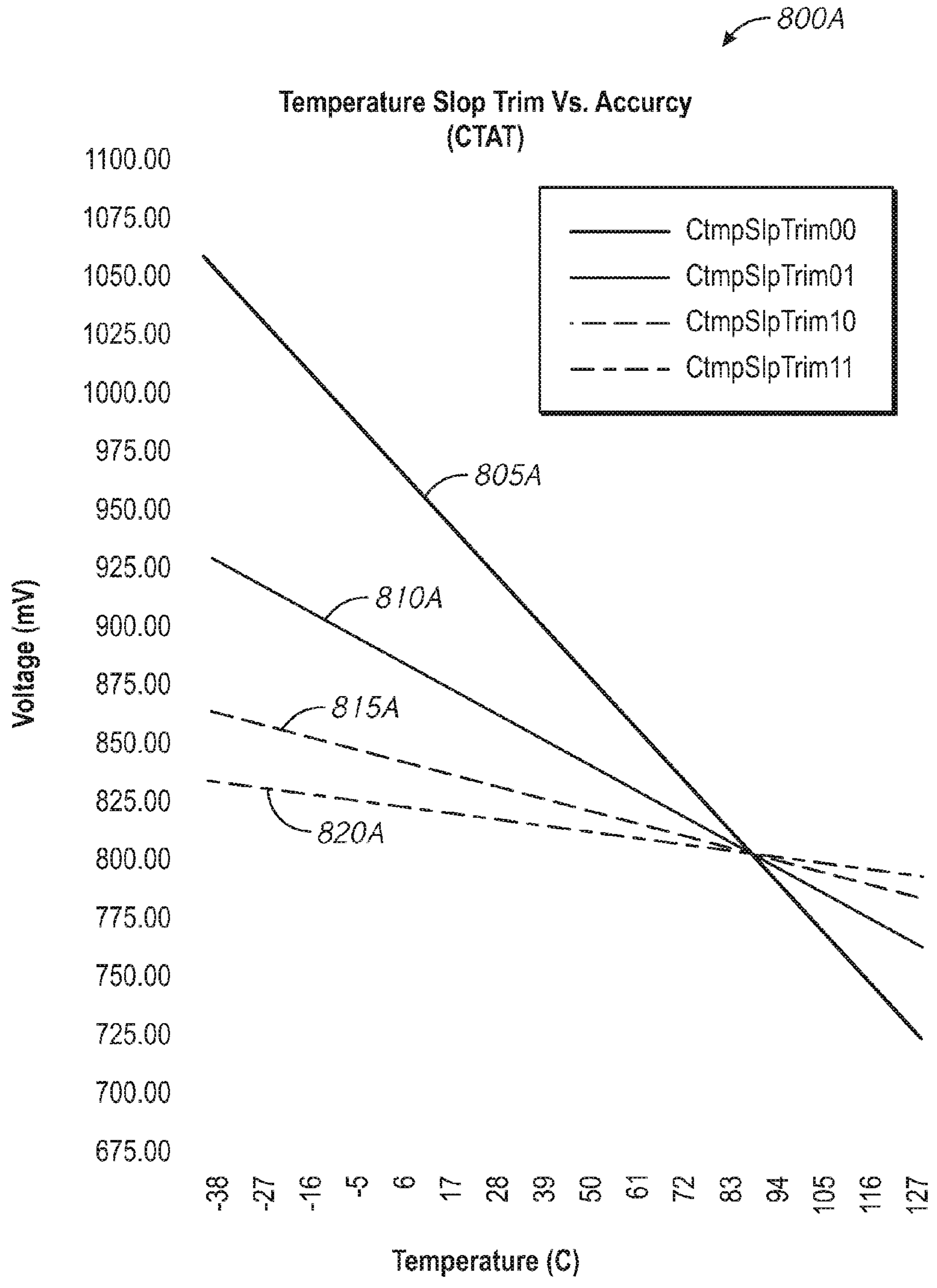
FIG. 8A illustrates voltage versus temperature for various temperature slope trim options for a CTAT signal, in accordance with various embodiments.
Figure 8B:
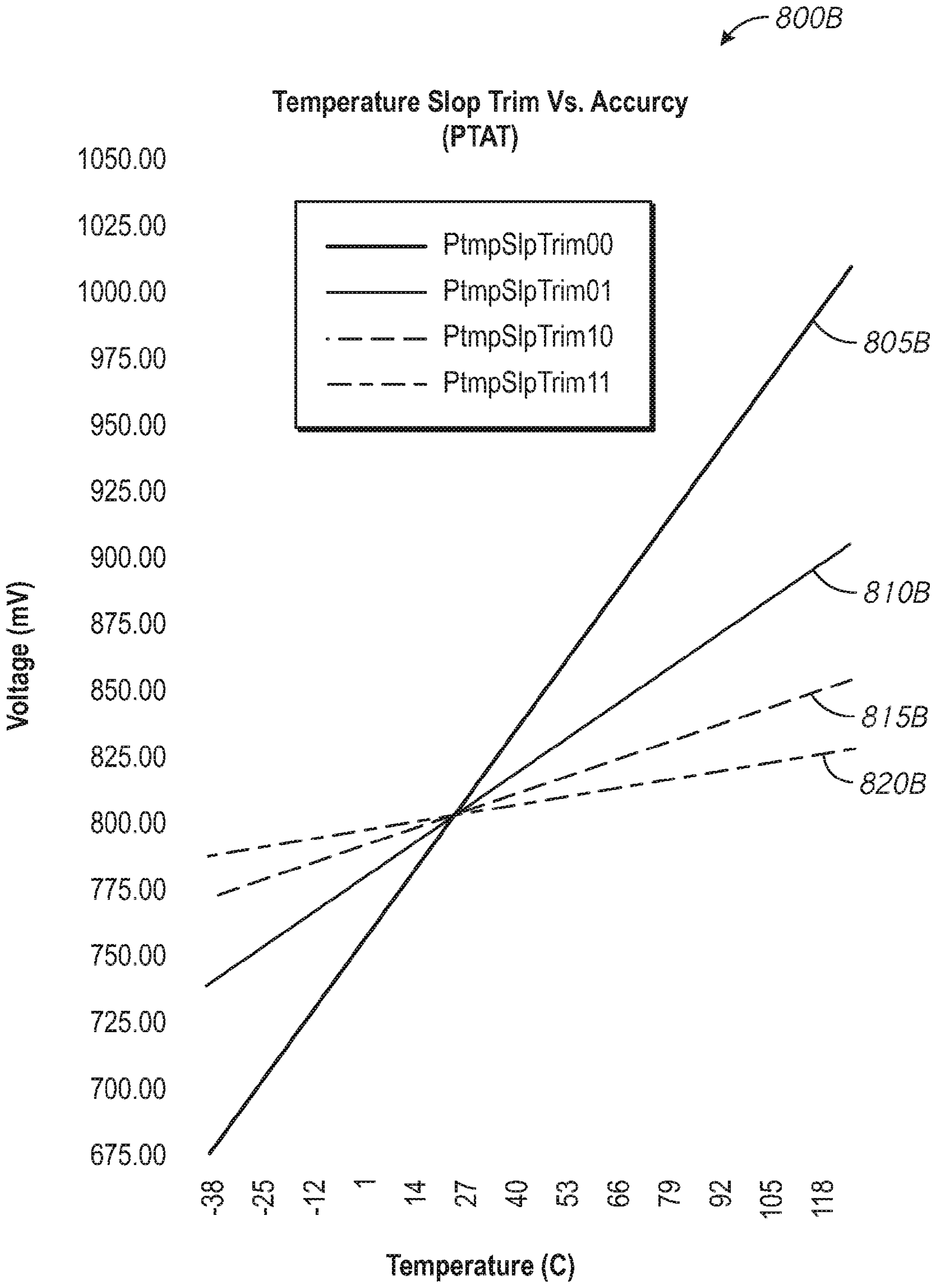
FIG. 8B illustrates voltage versus temperature for various temperature slope trim options for a PTAT signal, in accordance with various embodiments.

The effect on reference voltage can be seen in FIGS. 8A & 8B. FIGS. 8A & 8B respectively illustrate voltage versus temperature for various temperature slope trim options for CTAT signals 800A, and PTAT signals 800B. In various embodiments, several trim options may be available corresponding to different slope sensitivities. For example, a first trim option 805A, 805B may correspond to all bits of the temperature data being provided to the temperature slope reference generator 115. Thus, every 1 degree C. change in temperature may cause a corresponding step increase or decrease in the reference voltage Vref(T), the step corresponding to the temperature slope. A second trim option 810A, 810B, may correspond to the least significant bit being dropped, or otherwise shifted. Thus, only temperature changes of 2 degrees C. will cause a step increase or decrease in the reference voltage Vref(T). The third trim option 815A, 815B may correspond to a shift of the 3 least significant bits. This will decrease temperature sensitivity to only respond to temperature changes of 4 degrees C. A fourth trim option 820A, 820B may include a shift of the 4 least significant bits, corresponding to a temperature sensitivity of 8 degrees C.

In various embodiments, as a result of temperature sensitivity changes, the temperature slope at each of the trim options may also be changed. Accordingly, the temperature slope selection logic 520 may correspondingly select between the different temperature slopes. For example, at the first trim 805A, 805B, the temperature slope will be equal to the maximum temperature slope, set at the temperature slope reference generator 115. At the second trim option 810A, 810B, the temperature slope will be 50% of that of the maximum temperature slope. The third trim option 815A, 815B will correspond to 25% of the maximum temperature slope, and fourth trim option 820A, 820B to 12.5% of the maximum temperature slope. The temperature data, as further modified by the temperature slope selection logic 520, is then output to the temperature slope reference generator 115. The output of the temperature slope selection logic 520 may be referred to as temperature slope trim data.

In various embodiments, the voltage shift logic 525 may provide further input to the temperature slope reference generator 115 to create a DC shift in the temperature dependent reference voltage Vref(T). The voltage shift logic 525 may be configured to output a control signal, $V_{shift}$, to the slope reference generator 115, and configured to indicate a DC offset. In one set of embodiments, $V_{shift}$ may be a 3-bit signal. The DC offset may be configured to re-center the temperature dependent reference voltage, at a desired temperature, for a selected temperature dependence and temperature slope.

Figure 10A:
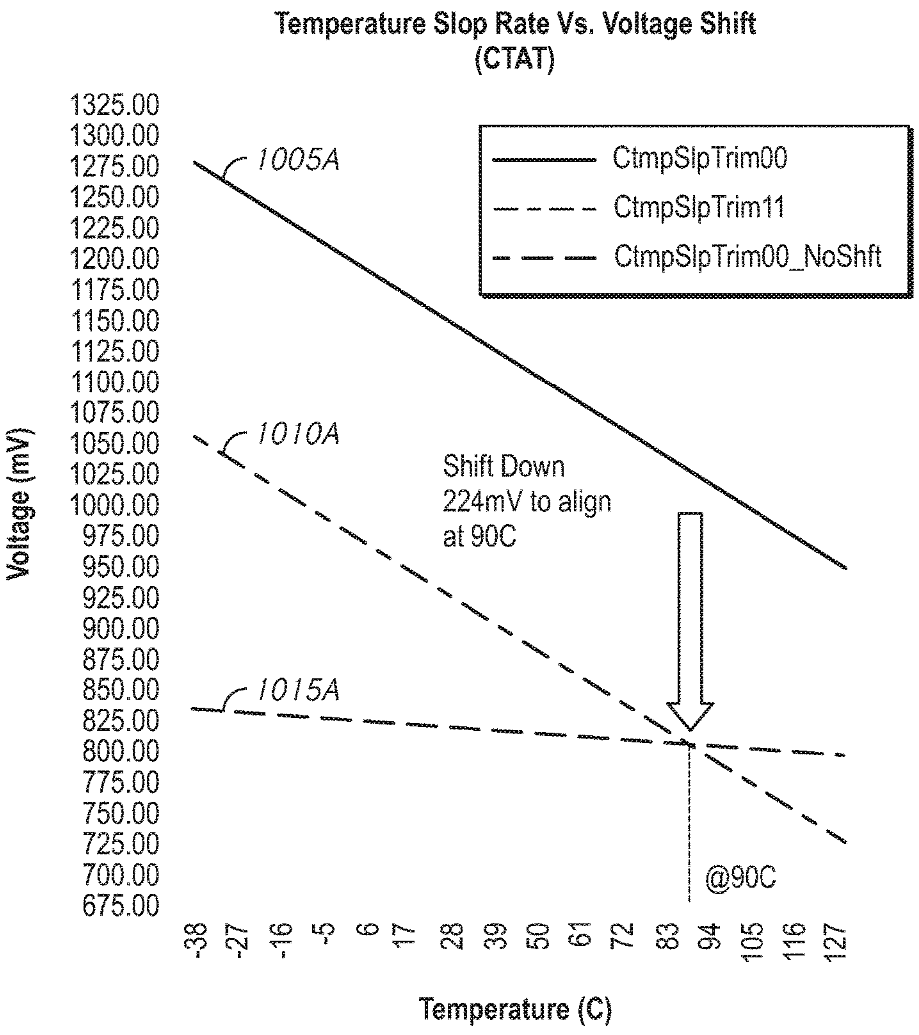
FIG. 10A illustrates a voltage shift of a temperature slope trim option for a CTAT signal, in accordance with various embodiments.
Figure 10B:
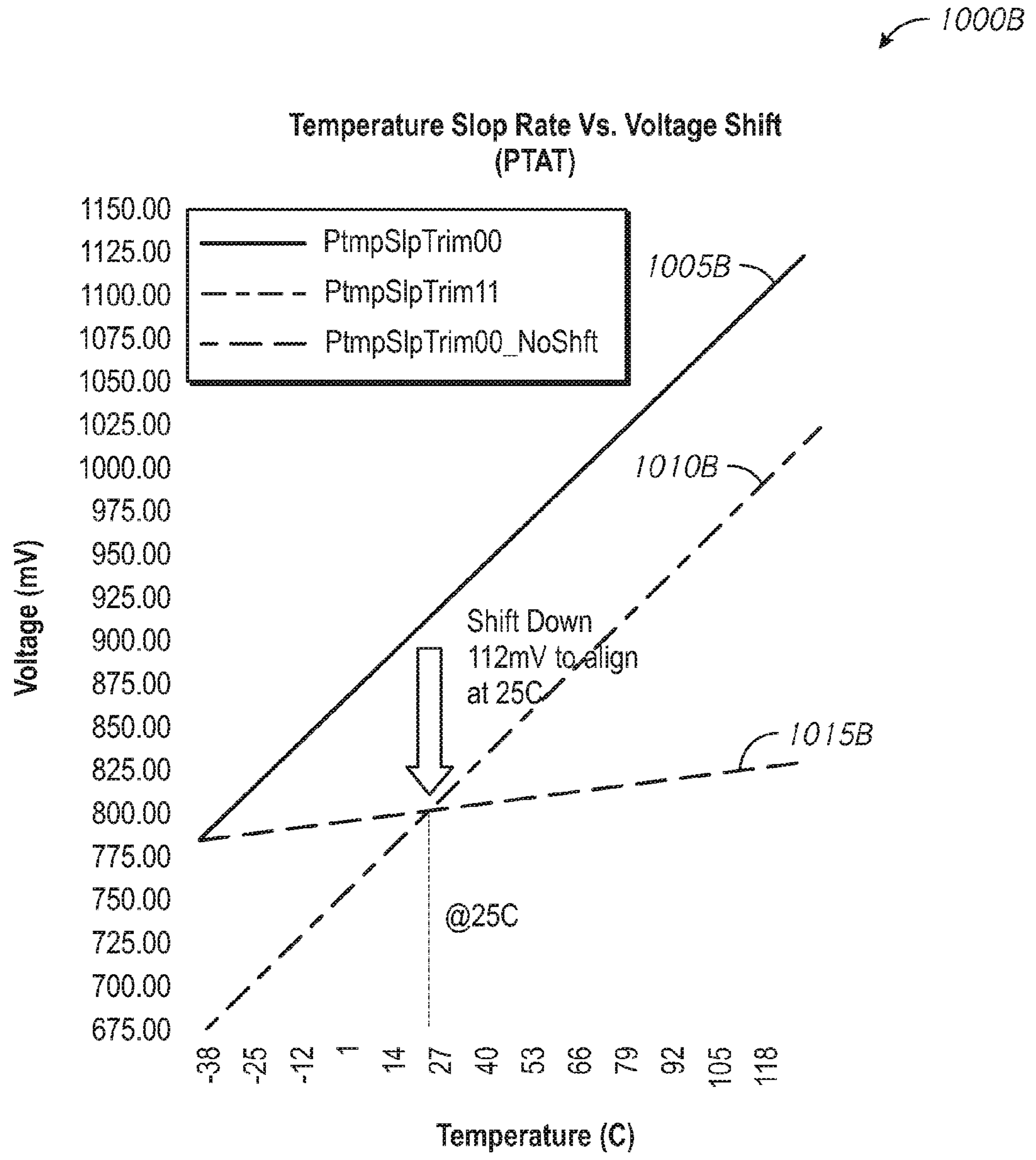
FIG. 10B illustrates a voltage shift of a temperature slope trim option for a PTAT signal, in accordance with various embodiments.

For example, FIGS. 10A & 10B respectively illustrate a voltage shift of CTAT and PTAT signals of a given temperature slope, according to various embodiments. FIG. 10A is a plot 1000A that includes a first CTAT signal 1005A with no offset, an offset first CTAT signal 1010A, and a second CTAT signal 1015A. FIG. 10B is a plot 1000B that includes corresponding PTAT signals. Accordingly, the plot 1000B includes a first PTAT signal 1005B with no offset, an offset first PTAT signal 1010B, and a second PTAT signal 1015B. In various embodiments, the CTAT and PTAT signals may correspond to temperature dependent reference voltages. In some embodiments, the first CTAT signal 1005A may have a first temperature slope. The first CTAT signal 1005A may be offset to coincide with the second CTAT signal 1015A, having a second temperature slope, at a desired temperature. For example, in one set of embodiments, the temperature may coincide with a high threshold temperature as set in the clip logic 505. Accordingly, the offset first CTAT signal 1010A may intersect the second CTAT signal 1015A at 90 C. Similarly, in the second plot 1000B, the first PTAT signal 1005B may have a first temperature slope, and may be offset to coincide with the second PTAT signal 1015B, having a second temperature slope. In this case, the offset first PTAT signal 1010B may intersect the second CTAT signal 1015B at a low threshold temperature, 25 C.

Figure 6:
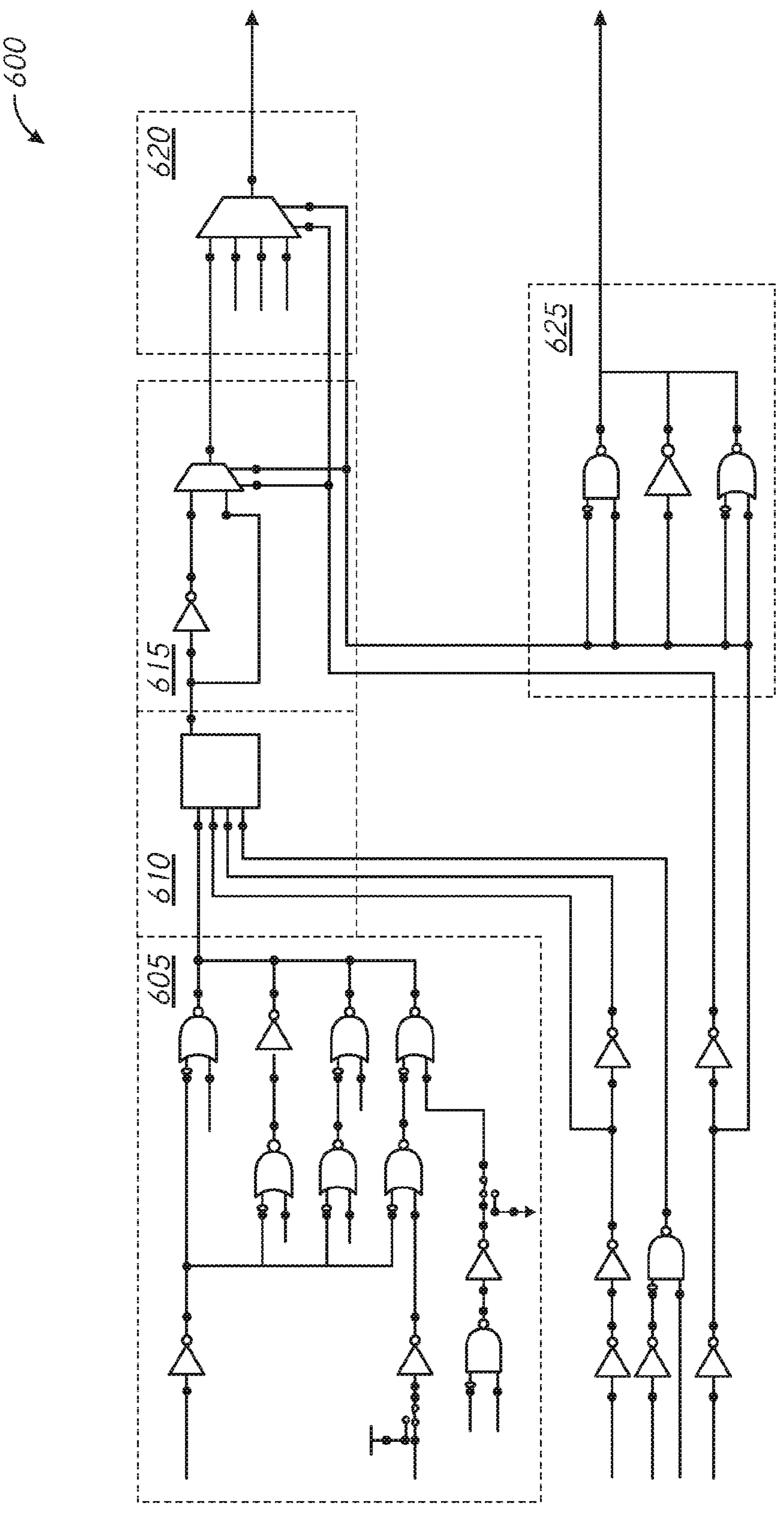
FIG. 6 is a trim circuit implementation of the control logic, in accordance with various embodiments.

FIG. 6 illustrates an example trim circuit implementation of control logic 600, according to various embodiments. The control logic 600 may include clipping circuit 605, latch 610, temperature dependence selection circuit 615, temperature slope selection circuit 620, and voltage shift circuit 625. As described above with respect to FIG. 5, in various embodiments, the clipping circuit 605 may be configured to receive a digital temperature reading, STS, from a temperature sensor 120. In some embodiments, STS may be an 8-bit signal indicative of a temperature. The clipping circuit 605 may be configured to decode STS and adjust the temperature code to reflect clipping at a low threshold temperature, high threshold temperature, or both. In further embodiments, the clipping circuit 605 may be configured to implement a flat temperature dependence based on input from a process monitor.

For example, according to one set of embodiments, the STS may be an 8-bit signal centered around 90 C. Accordingly, at a temperature of 90 C, the 8-bit signal may be 0x00. As illustrated, a trim switch may be activated to enable clipping at 90 C, and a second trim switch may be activated to also enable clipping at 25 C. Accordingly, if STS is at 90 C or above, if the most significant bit STS<7> is 0, clipping circuit 605 may be configured mask the remaining bits STS <6:0>, in bit positions 6 through 0, to a 0 value. Similarly, if STS is at 25 C—corresponding to 0xBF—or below, the clipping circuit 605 may force the first two most significant bits STS <7:6>, in bit positions 7 and 6, to 1, and mask the remaining bits STS <5:0> to 0. Accordingly, the clipping circuit may output a temperature code corresponding to 26 C at 25 C or below. If STS is between 25 C and 90 C, the temperature code is passed to the latch 610 with no adjustment. In some further embodiments, as illustrated, if flat temperature dependence is selected, the most significant bit may be forced to 0, effectively forcing the temperature code to remain at 90 C.

In various embodiments, the latch 610 may receive, from the clipping circuit 605, clipped temperature data. In some embodiments, the latch 610 may latch the clipped temperature data based on a latch signal from the temperature sensor 120, such as StsProbe. The latched temperature data may then be read by temperature dependence selection circuit 615. According to various embodiments, the temperature dependence selection circuit 615 may include a multiplexer for storing both an inverted and non-inverted versions of the latched temperature data. For example, in one set of embodiments, continuing with the example above, the multiplexer may include two input buses, a first input bus carrying the inverted 8-bit temperature code, and a second input bus carrying the non-inverted 8-bit temperature code. As described above, the inverted and non-inverted temperature data may correspond to CTAT and PTAT selection, respectively. Selection between the inverted and non-inverted temperature data may be based on trim selection signals from an on-die process monitor.

The temperature data reflecting the temperature dependence selection (e.g. inverted vs. non-inverted) may be provided, from the temperature dependence selection circuit 615, to the temperature slope selection circuit 620. In one set of embodiments, the temperature slope selection circuit 620 may be configured to select between several inputs carrying the temperature data, and the temperature data after it has undergone a series of logical right-shifts. For example, the temperature slope selection circuit 620 may include a multiplexer having four input buses, a first input bus carrying all 8-bits of the temperature code, a second input bus carrying a 1-bit logical right shifted version of the temperature code <7:1>. The third input bus may carry the temperature code having undergone a logical right shift of 2-bits <7:2>. The fourth input bus may carry the temperature code after a logical right-shift of 3-bits <7:3>. Each of the four sets of temperature codes may correspond to a different temperature slope and temperature sensitivity, as described above with respect to FIGS. 8A & 8B. Accordingly, as with the temperature dependence selection circuit 615, selection between the four inputs may be based on trim selection signals from the on-die process monitor, which may be indicative of the characteristics of the process corner. The resulting output of the temperature slope selection circuit 620 may be provided to the temperature slope reference generator 115.

In various embodiments, the control logic 600 may further provide a voltage shift signal to the temperature slope reference generator. In the depicted embodiments, the voltage shift signal, $V_{shift}$, may be a 3-bit signal. As described above with respect to FIGS. 5 & 10, $V_{shift}$ may be indicative of a DC offset, and configured to re-center the temperature dependent reference voltage at a desired temperature. As depicted, in some embodiments, $V_{shift}$ may be determined based on the trim selection signals from an on-die process monitor.

Figure 7:
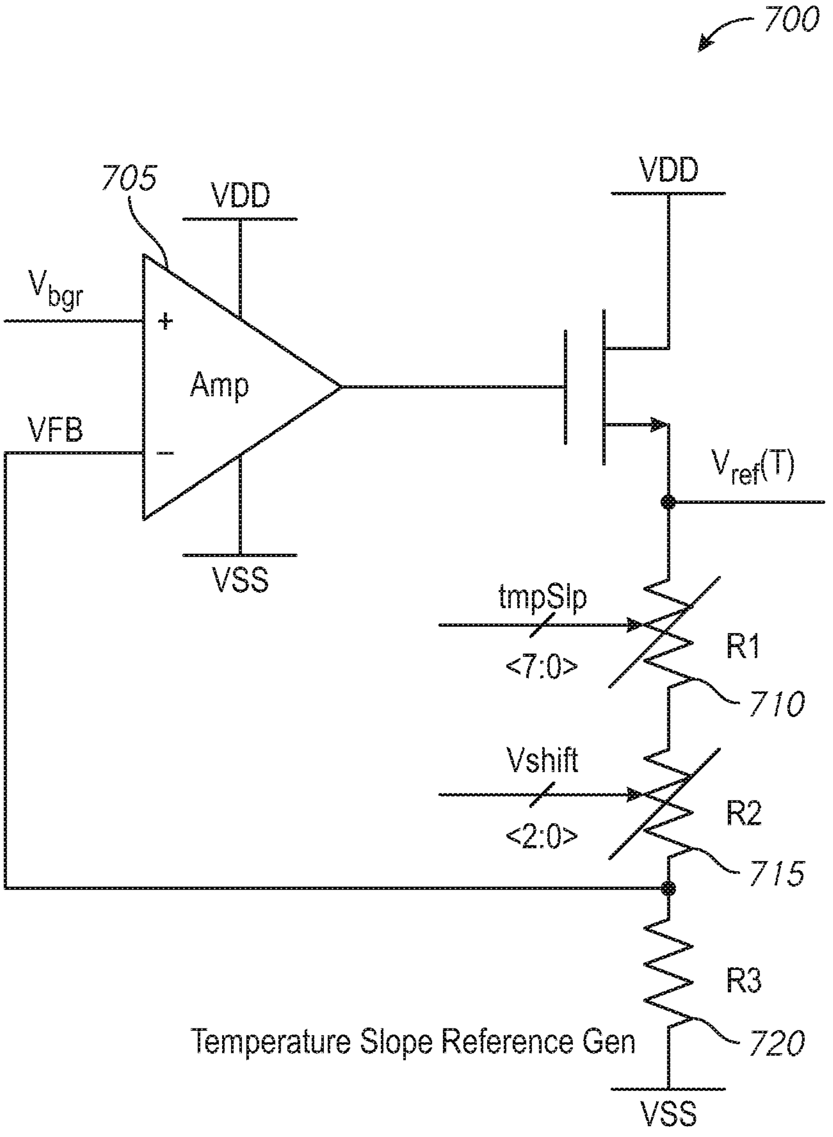
FIG. 7 is a schematic diagram of a temperature slope reference generator, in accordance with various embodiments.

The temperature slope reference generator 115 will be described in further detail with reference to FIG. 7. FIG. 7 is a schematic diagram of a temperature slope reference generator 700 according to various embodiments. The temperature slope reference generator 700 may include amplifier 705, and a temperature slope trim resistance stack 710, a voltage shift resistance stack 715, and unit resistance stack 720. The amplifier 705 may be configured to receive a constant bandgap voltage Vbgr at a non-inverting input, and have a feedback path, tied to the inverting input, between unit resistance 720 and voltage shift resistance stack 715. In this way, the feedback path may be tied to the output of the temperature slope reference generator 700 after the temperature slope trim and voltage shift are applied.

In various embodiments, the temperature slope trim resistance stack 710 may be configured to receive temperature slope trim data from the control logic 110, 500, 600. In one set of embodiments, the temperature slope trim data may be an 8-bit signal indicative of both a type of temperature dependence and a temperature slope. When PTAT temperature dependence is selected, the temperature slope data may increment as temperature rises. Accordingly, the temperature slope trim resistance stack 710 may be configured to also increase resistance as the temperature slope data increments. For example, in some embodiments, the temperature slope trim resistance stack 710 may be configured to exhibit a resistance that is a multiple of the unit resistance based on the temperature code. In one set of embodiments, the temperature slope trim resistance stack 710 may be a binary trim with unit resistances of 1×, 2×, 4×, 8×, 16×, 32×, 64×, and 128× unit resistance. Thus, the temperature slope trim resistance stack 710 may have a resistance that is the value of the temperature slope trim data times the unit resistance.

Similarly, the voltage shift resistance stack 715 may be configured to receive $V_{shift}$. In one set of embodiments, $V_{shift}$ may be a 3-bit signal indicative of a trim selection signal from the control logic 110, 500, 600. In various embodiments, the voltage shift resistance stack 715 may be configured to change resistance responsive to the DC offset.

Figure 3:
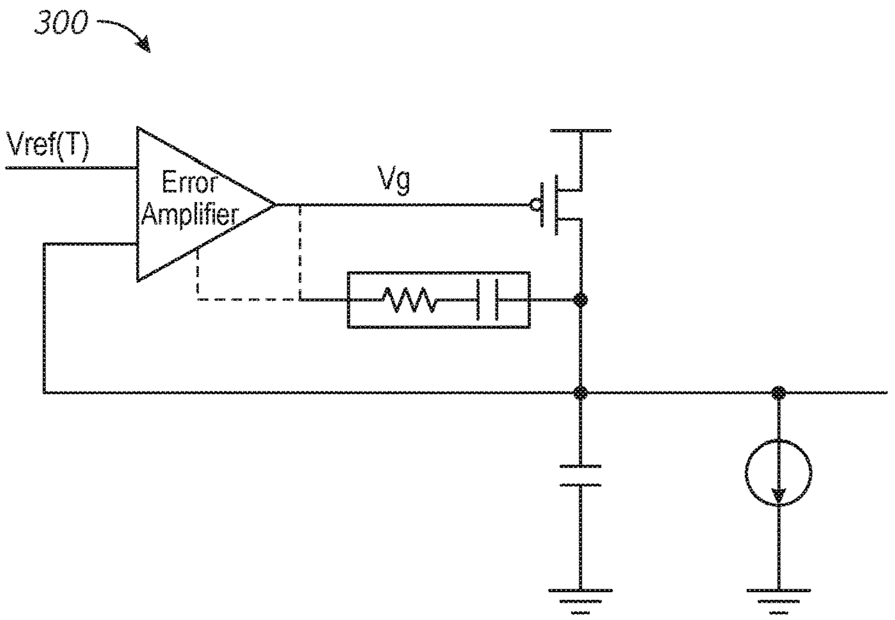
FIG. 3 is a schematic diagram of a conventional DC-DC converter, in accordance with various embodiments.

Accordingly, the temperature slope reference generator 700 may generate a temperature dependent reference voltage, $V_{ref}(T)$, based on temperature slope trim data and a $V_{shift}$. $V_{ref}(T)$ may then be provided to DC-DC voltage converter 130 for the generation of an internal supply voltage. FIG. 3 illustrates a schematic diagram of an example DC-DC voltage converter 300 according to various embodiments. DC-DC voltage converters are widely used in electronic systems, particularly for applications requiring power supplies with low noise and low ripple. In various embodiments, the DC-DC voltage converter may be part of dynamic random access memory (DRAM), and may supply power to the memory array and other peripherals such as in the data path, pumps, ring oscillators, and other noise sensitive analog circuit blocks. Generally, the DC-DC voltage converter is not only a voltage regulator, but also serves as a current buffer. The DC-DC voltage converter of FIG. 3 is shown in a unity gain configuration. By supplying $V_{ref}(T)$ as an input to the DC-DC voltage converter, the temperature dependence of the reference voltage will also be exhibited in the internal supply voltage.

Figure 11:
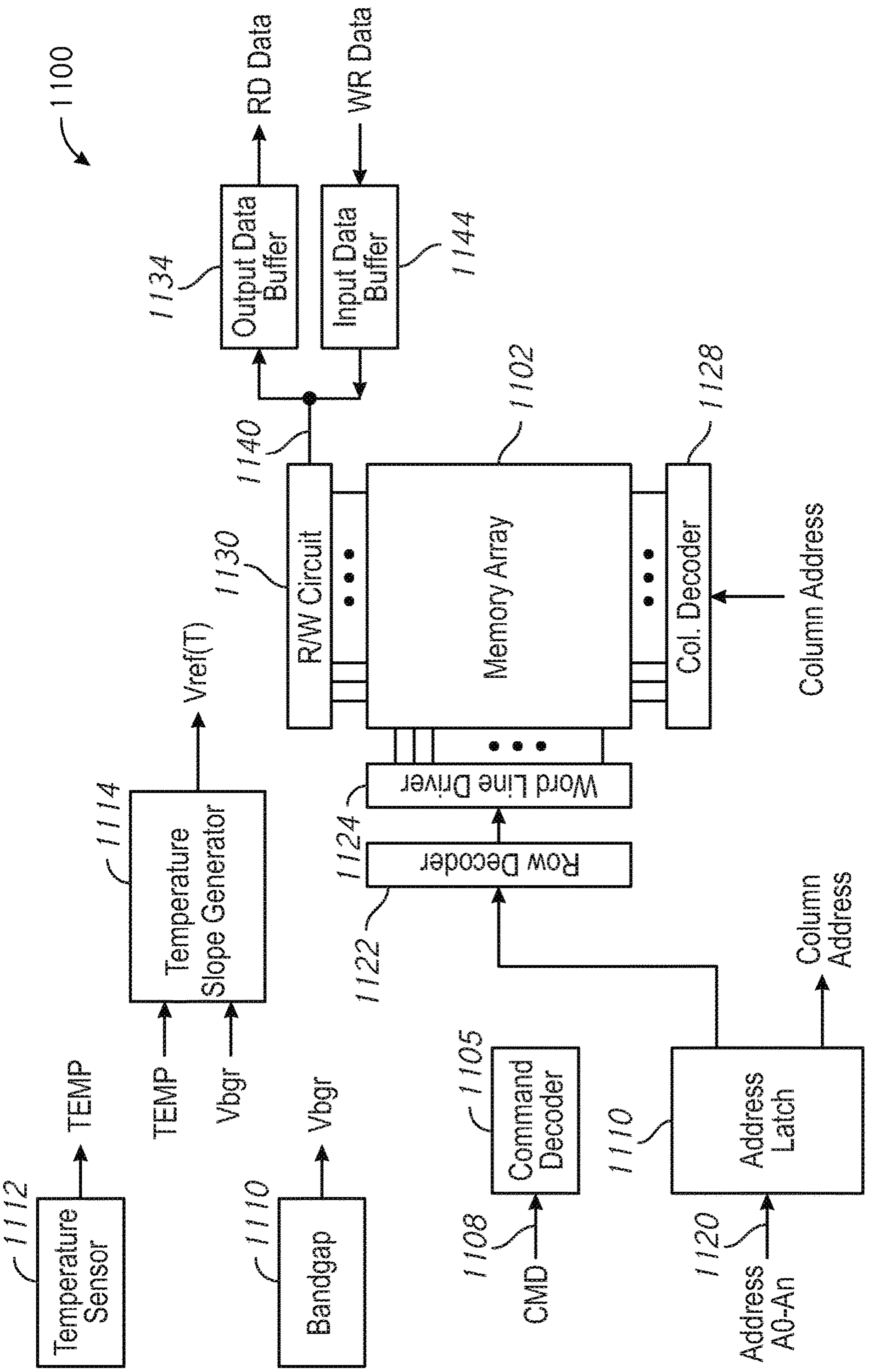
FIG. 11 is a block diagram of a memory system, in accordance with various embodiments.

FIG. 11 illustrates a block diagram of a portion of a memory system 1100, in accordance with various embodiments. The system 1100 includes an array 1102 of memory cells, which may be, for example, volatile memory cells (e.g., dynamic random-access memory (DRAM) memory cells, low-power DRAM memory (LPDRAM), static random-access memory (SRAM) memory cells), non-volatile memory cells (e.g., flash memory cells), or other types of memory cells. The memory 1100 includes a command decoder 1106 that may receive memory commands through a command bus 1108 and provide (e.g., generate) corresponding control signals within the memory 1100 to carry out various memory operations. For example, the command decoder 1106 may respond to memory commands provided to the command bus 1108 to perform various operations on the memory array 1102. In particular, the command decoder 1106 may be used to provide internal control signals to read data from and write data to the memory array 1102. Row and column address signals may be provided (e.g., applied) to an address latch 1110 in the memory 1100 through an address bus 1120. The address latch 1110 may then provide (e.g., output) a separate column address and a separate row address.

The address latch 1110 may provide row and column addresses to a row address decoder 1122 and a column address decoder 1128, respectively. The column address decoder 1128 may select bit lines extending through the array 1102 corresponding to respective column addresses. The row address decoder 1122 may be connected to a word line driver 1124 that activates respective rows of memory cells in the array 1102 corresponding to the received row addresses. The selected data line (e.g., a bit line or bit lines) corresponding to a received column address may be coupled to a read/write circuitry 1130 to provide read data to an output data buffer 1134 via an input-output data path 1140. Write data may be provided to the memory array 1102 through an input data buffer 1144 and the memory array read/write circuitry 1130.

Temperature sensor 1112 may be implemented by an embodiment of the temperature sensor 120, 400 as previously described, for example. The temperature sensor 1112 may measure a temperature and provide a temperature, TEMP, for example, to other circuits of the memory 1100, such as temperature slope generator 1114. In one set of embodiments, TEMP may be a digital temperature reading, such as STS, as described in previous embodiments. In some embodiments, the memory 1100 may adjust some of their operations based on temperature readings provided by the temperature sensor 1112. Bandgap voltage generator 1116 may be implemented by an embodiment of the bandgap voltage generator 125, 200 as previously described. The bandgap voltage generator 1116 may be communicatively coupled to the temperature slope generator 1114, and configured to generate a constant bandgap voltage, Vbgr, that is temperature independent. The temperature slope generator 1114 may be implemented by embodiments of the temperature slope generator 105, as previously described. For example, the temperature slope generator 1114 may include control logic 110 and a temperature slope reference generator 115. The temperature slope generator 1114 may be configured to receive temperature data from the temperature sensor 1112, and output a temperature dependent reference voltage, $V_{ref}(T)$, as previously described.

While certain features and aspects have been described with respect to exemplary embodiments, one skilled in the art will recognize that various modifications and additions can be made to the embodiments discussed without departing from the scope of the invention. Although the embodiments described above refer to particular features, the scope of this invention also includes embodiments having different combination of features and embodiments that do not include all of the above described features. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, various procedures may be reordered, added, and/or omitted in accordance with various embodiments. The procedures described with respect to one method or process may be incorporated within other described methods or processes; likewise, hardware components described according to a particular structural architecture and/or with respect to one system may be organized in alternative structural architectures and/or incorporated within other described systems. Hence, while various embodiments are described with or without certain features for ease of description, the various components and/or features described herein with respect to a particular embodiment can be combined, substituted, added, and/or subtracted from among other described embodiments. Consequently, although several exemplary embodiments are described above, it will be appreciated that the invention is intended to cover all modifications and equivalents within the scope of the following claims.

What is claimed is:

1. A system comprising:

a temperature sensor configured to provide a first signal indicative of temperature data;

a temperature slope generator communicatively coupled to the temperature sensor, the temperature slope generator further comprising:

control logic configured to produce a second signal, based on the first signal, indicative of a temperature dependence, a temperature slope, and the temperature data;

a temperature slope reference generator configured to produce a reference voltage having the temperature dependence and the temperature slope, based on the second signal.

2. The system of claim 1, wherein the temperature dependence is one of a proportional to absolute temperature, a complementary to absolute temperature, or a flat temperature dependence.

3. The system of claim 1, wherein the temperature slope is determined, at least in part, by a temperature sensitivity of the reference voltage, wherein temperature sensitivity determines a threshold change in temperature data needed to cause a voltage change in the reference voltage, and wherein the control logic is configured to adjust the temperature sensitivity of the reference voltage.

4. The system of claim 1, wherein the temperature slope reference generator further comprises a temperature slope trim resistance stack, wherein the temperature slope trim resistance stack is configured to change in resistance based at least in part on the second signal.

5. The system of claim 4, wherein the temperature slope is based at least in part on the temperature slope trim resistance stack, wherein the temperature slope trim resistance stack defines the amount of voltage change in the reference voltage in relation to a change in the temperature data.

6. The system of claim 1, wherein the second signal is further indicative of a voltage shift in the reference voltage, and wherein the voltage shift is based, at least in part, on the temperature slope.

7. The system of claim 6, wherein the temperature slope reference generator further comprises a voltage shift resistance stack configured to cause the direct-current voltage shift in the reference voltage.

8. The system of claim 1, wherein the second signal is further indicative of clipping behavior at at least one of a high threshold temperature or a low threshold temperature, wherein the temperature slope reference generator is further configured to clip the reference voltage at the at least one of the high threshold temperature or the low threshold temperature.

9. The apparatus of claim 1, wherein the control logic is communicatively coupled with a process monitor, wherein the process monitor is configured to provide one or more control signals indicative of a process corner to the control logic, wherein the control logic determines at least one of the temperature dependence and temperature slope based, at least in part, on the process corner.

10. An apparatus comprising:

control logic configured receive temperature data, wherein the control logic is configured to produce a signal, based on the temperature data, indicative of the temperature data, a temperature dependence and a temperature slope, wherein the signal is further indicative of a voltage shift in the reference voltage, and wherein the voltage shift is based, at least in part, on the temperature slope;

a temperature slope reference generator configured to produce a reference voltage having the temperature dependence and the temperature slope, based on the signal.

11. The apparatus of claim 10, wherein the temperature dependence is one of a proportional to absolute temperature, a complementary to absolute temperature, or a flat temperature dependence.

12. An apparatus comprising:

control logic configured receive temperature data, wherein the control logic is configured to produce a signal, based on the temperature data, indicative of the temperature data, a temperature dependence and a temperature slope; and a temperature slope reference generator configured to produce a reference voltage having the temperature dependence and the temperature slope, based on the signal, wherein the temperature slope is determined, at least in part, by a temperature sensitivity of the reference voltage, wherein temperature sensitivity determines a threshold change in temperature data needed to cause a voltage change in the reference voltage, and wherein the control logic is configured to adjust the temperature sensitivity of the reference voltage.

13. An apparatus comprising:

control logic configured receive temperature data, wherein the control logic is configured to produce a signal, based on the temperature data, indicative of the temperature data, a temperature dependence and a temperature slope; and a temperature slope reference generator configured to produce a reference voltage having the temperature dependence and the temperature slope, based on the signal, wherein the temperature slope is determined, at least in part, by the temperature slope reference generator, wherein the temperature slope reference generator is configured to determine the amount of voltage change in the reference voltage in relation to a change in the temperature data.

14. An apparatus comprising:

control logic configured receive temperature data, wherein the control logic is configured to produce a signal, based on the temperature data, indicative of the temperature data, a temperature dependence and a temperature slope; and a temperature slope reference generator configured to produce a reference voltage having the temperature dependence and the temperature slope, based on the signal, wherein the signal is further indicative of clipping behavior at least one of a high threshold temperature or a low threshold temperature, wherein the temperature slope reference generator is further configured to clip the reference voltage at the at least one of the high threshold temperature or the low threshold temperature.

15. An apparatus comprising:

a temperature slope generator, communicatively coupled to a temperature sensor and configured to:

receive temperature data from the temperature sensor;

determine a temperature dependence for a reference voltage;

determine a temperature slope for the reference voltage; and generate the reference voltage, having at least the temperature dependence and the temperature slope, based on the temperature data, wherein the temperature slope generator is further configured to shift the reference voltage by an offset voltage, and wherein the offset voltage is based, at least in part, on the temperature slope.

16. An apparatus comprising:

a temperature slope generator, communicatively coupled to a temperature sensor and configured to:

receive temperature data from the temperature sensor;

determine a temperature dependence for a reference voltage;

determine a temperature slope for the reference voltage; and generate the reference voltage, having at least the temperature dependence and the temperature slope, based on the temperature data, wherein the temperature slope generator is further communicatively coupled to a process monitor, wherein the temperature slope generator is further configured to receive one or more control signals from the process monitor, wherein the control signals are indicative of a process corner, and wherein at least one of the temperature dependence and the temperature slope are determined, at least in part, based on the process corner.

17. An apparatus comprising:

a temperature slope generator, communicatively coupled to a temperature sensor and configured to:

receive temperature data from the temperature sensor;

determine a temperature dependence for a reference voltage;

determine a temperature slope for the reference voltage; and generate the reference voltage, having at least the temperature dependence and the temperature slope, based on the temperature data, wherein the temperature slope generator is further configured to implement clipping behavior at least one of a high threshold temperature or a low threshold temperature, wherein the temperature slope reference generator is further configured to clip the reference voltage at the at least one of the high threshold temperature or the low threshold temperature.

18. An apparatus comprising:

a temperature slope generator, communicatively coupled to a temperature sensor and configured to:

receive temperature data from the temperature sensor;

determine a temperature dependence for a reference voltage;

determine a temperature slope for the reference voltage; and generate the reference voltage, having at least the temperature dependence and the temperature slope, based on the temperature data, wherein the temperature slope is determined, at least in part, by a temperature sensitivity of the reference voltage, wherein temperature sensitivity determines a threshold change in temperature data needed to cause a voltage change in the reference voltage, and wherein the temperature slope generator is configured to adjust the temperature sensitivity of the reference voltage.

* * * * *